United States Patent
Yu

(10) Patent No.: US 9,598,293 B2
(45) Date of Patent: Mar. 21, 2017

(54) FEATHER OIL ABSORBENT BOOM STRUCTURE

(76) Inventor: Zhenhuang Yu, Shanghai (CN)

( * ) Notice: Subject to any disclaimer, the term of this patent is extended or adjusted under 35 U.S.C. 154(b) by 301 days.

(21) Appl. No.: 14/379,749

(22) PCT Filed: Mar. 11, 2012

(86) PCT No.: PCT/CN2012/072169
§ 371 (c)(1),
(2), (4) Date: Aug. 20, 2014

(87) PCT Pub. No.: WO2013/134909
PCT Pub. Date: Sep. 19, 2013

(65) Prior Publication Data
US 2015/0034549 A1    Feb. 5, 2015

(51) Int. Cl.
*C02F 1/28* (2006.01)
*E02B 15/10* (2006.01)
*E02B 15/06* (2006.01)
*B01D 17/02* (2006.01)
*C02F 103/00* (2006.01)
*C02F 1/40* (2006.01)
*C02F 1/68* (2006.01)
*C02F 101/32* (2006.01)

(52) U.S. Cl.
CPC .......... *C02F 1/286* (2013.01); *B01D 17/0202* (2013.01); *C02F 1/285* (2013.01); *E02B 15/06* (2013.01); *E02B 15/101* (2013.01); *C02F 1/40* (2013.01); *C02F 1/681* (2013.01); *C02F 2101/32* (2013.01); *C02F 2103/007* (2013.01)

(58) Field of Classification Search
CPC ........ B01D 17/0202; C02F 1/40; C02F 1/285; C02F 1/286; C02F 1/681; C02F 2101/32; C02F 2103/007; E02B 15/06; E02B 15/101
USPC ...................... 210/242.4, 484, 496, 508, 924
See application file for complete search history.

(56) References Cited

U.S. PATENT DOCUMENTS

| | | | | |
|---|---|---|---|---|
| 3,565,257 A | * | 2/1971 | Cavalieri | ............... E02B 15/06 210/242.4 |
| 4,439,324 A | * | 3/1984 | Crotti | ................. B01D 17/0202 210/691 |
| 5,348,661 A | * | 9/1994 | Hill | ......................... C02F 1/681 210/242.4 |

FOREIGN PATENT DOCUMENTS

CN       101942742 A  *  1/2011  ............ B01J 20/261

OTHER PUBLICATIONS

Translation of the description section of CN101942742A obtained from the EPO website on Mar. 11, 2016, URL:<http:epo.org/searching-for-patents/technical/espacenet.html>, 8 pages.*

* cited by examiner

*Primary Examiner* — Matthew O Savage

(57) ABSTRACT

A feather oil absorbent boom structure comprising an inner core and an outer ring winding outside the inner core; the inner core is a cloth bag, and the cloth bag is filled with feather oil absorbent material; the cloth bag is made of spunbonded-melt blown-spunbonded polyporpylene non-woven cloth; the outer ring is a plate-shaped oil absorbent felt formed through thermal fusion of feathers and bicomponent fibers of polypropylene/polyethylene having a low melting point; the weight ratio of the feathers to the bicomponent fibers is 70-85:15-30. The feather oil absorbent boom is capable of providing reliable buoyancy, and slowing down the reduction of the strength of the inner core. Further disclosed is a preparation method for the feather oil absorbent boom structure.

5 Claims, 1 Drawing Sheet

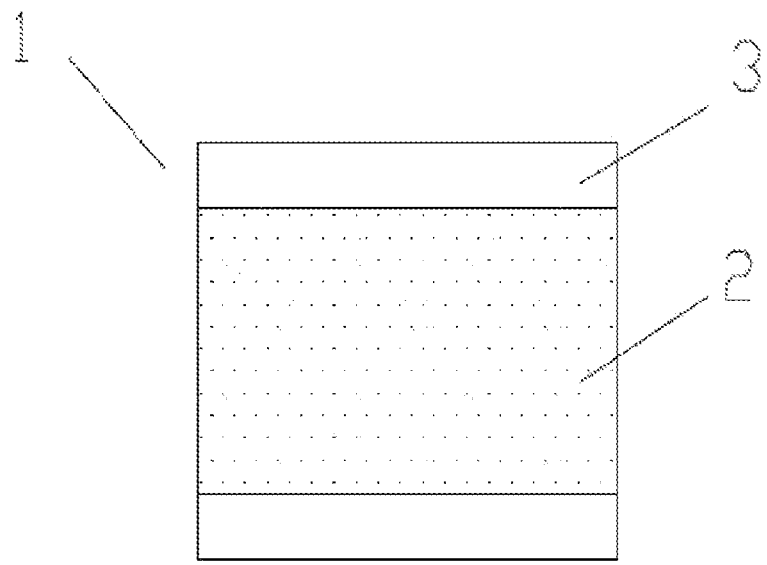

FEATHER OIL ABSORBENT BOOM STRUCTURE

BACKGROUND OF THE INVENTION

The present invention relates to a kind of oil absorbent boom, and more specifically relates to a feather oil absorbent boom structure prepared from feather and a preparation method therefor. The present invention relates to the field of environmental protection.

Down products nowadays use feathers of geese and ducks in the poultry farming industry as raw material for production. There are 20-25% of down in a feather and down is the main material to be used to produce down products while around 75% of the remaining feather are wastage having very low added value and being used generally as an additive to keratin feed after crushing. In the above usages of down and feathers, down and feathers are loosely dispersed during use; because their fibers contain lots of cavities and are therefore light in weight, the down and feathers can easily float in the air causing secondary pollution in the natural environment.

In recent years, marine pollution due to marine oil spill occurs occasionally. It is therefore an imminent task to solve the problem of marine pollution. Since feather is a material very good at oil absorption, its use for oil absorption and removal after oil spill is developed. Feather raw materials for subsequent industrial use should be rinsed and degreased to satisfy the requirements for health protection of workers. Feathers being rinsed and degreased can absorb oil as well as water with very quick absorption rate for oil and relatively slow absorption rate for water. When water is polluted by oil or organic solvents, the polluted area is first surrounded by an oil absorbent boom to prevent the pollutants from spreading. If the scale of pollution is large, it may take a few days to treat the oil pollution. Since feather also absorbs water and its density (1.33 g/cm$^3$) is higher than the density of water, the oil absorbent boom may absorb water and sink in the few days during treatment of the oil pollution, thereby reducing the portion of the oil absorbent boom above the water. In case of big wind and big waves, the oil absorbent boom may not be able to contain the oil effectively.

Furthermore, oil absorbent material of a feather oil absorbent boom is generally put into a tubular bag. The tubular bag is made of polypropylene (PP) nonwoven cloth. PP material has poor at resisting ultraviolet degradation. If it is exposed to direct sunlight, strength of the bag will reduce drastically and the bag may be damaged under the effect of wind and waves and thus exposing the oil absorbent material inside and hence affecting the oil absorption performance of the feather oil absorbent boom; also, the oil absorbent material may float on water and thus affecting oil pollution treatment, for example when using meltblown PP oil absorbent material.

BRIEF SUMMARY OF THE INVENTION

In view of the aforesaid disadvantages now present in the prior arts, the present invention provides a kind of feather oil absorbent boom structure. The feather oil absorbent boom of the present invention has a compound structure comprising an inner core and an outer ring. The inner core allows reliable buoyancy of the feather oil absorbent boom, while the outer ring strengthens and protects the inner core to prevent possible reduction of its strength due to direct exposure to sunlight.

Another object of the present invention is to provide a preparation method for preparing the feather oil absorbent boom structure.

The present invention has the following technical proposal:

A feather oil absorbent boom structure; the feather oil absorbent boom comprises:

an inner core; and an outer ring winding outside the inner core.

The inner core is a cloth bag; feather oil absorbent material is filled into the cloth bag.

The cloth bag is made of spunbonded-meltblown-spunbonded polyprophlene (PP) nonwoven cloth which includes a layer of meltblown polypropylene nonwoven fabric located between two layers of spunbonded polypropylene nonwoven fabric. nonwoven cloth. The nonwoven cloth has a surface density of 24 g/m$^2$-50 g/m$^2$ and hydrostatic pressure tolerance of ≥300 mmH$_2$O.

The outer ring is a plate-shaped oil absorbent felt formed through thermal fusion of feathers and bicomponent fibers of polypropylene/polyethylene having a low melting point. The weight ratio of the feathers to the polypropylene/polyethylene fibers is 70-85:15-30. The plate-shaped oil absorbent felt has an average surface density of 150 g/m$^2$-400 g/m$^2$.

Preferably, the feather oil absorbent material is plate-shaped or tube-shaped or block-shaped oil absorbent felt formed through thermal fusion of feathers and bicomponent fibers of polypropylene/polyethylene having a low melting point.

Preferably, the feather oil absorbent material is regenerated fibers, cellulosic fibers or feather strands.

Preferably, a relationship between radius of the cloth bag and sunk volume of the feather oil absorbent boom structure is express according to the following formula:

$$R_x = \sqrt{\frac{\pi \mathcal{R}^2 r + w - a\% \pi \mathcal{R}^2 r}{\pi r}}$$

wherein:

$R_x$ refers to radius of the cloth bag;

w refers to weight (g) of a unit length (1 m) of the feather oil absorbent boom;

π refers to circumference ratio;

R refers to radius (m) of the oil absorbent boom;

r refers to water density (g/m$^3$); and a % refers to a required percentage of a volume of the feather oil absorbent boom structure sunk into water with respect to a total volume of the feather oil absorbent boom structure, when the feather oil absorbent material of the outer ring is absorbed with water and is saturated.

Preferably, density of the inner core is 10 kg/m$^3$-32 kg/m$^3$.

Preferably, the oil absorbent felt is prepared according to the following method:

a) Mix the feathers and the bicomponent fibers of polypropylene/polyethylene having a low melting point to obtain a mixture; wherein weight ratio of the feathers to the bicomponent fibers of polypropylene/polyethylene in the mixture is 70-85:15-30;

b) Use the mixture of step a to form a fibrous web by means of an air-laid web forming machine;

c) Subject the fibrous web to thermal fusion under 125° C.-165° C. to form a continuous and porous oil absorbent felt.

According to the present invention, the oil absorbent felt can be prepared by feathers or feather strands. The feather strands are obtained by removing feather shafts of feather wastage produced by down processing industry and shuttlecock manufacturing industry by means of special techniques. During preparation of the oil absorbent felt, feathers or feather strands are mixed with the polypropylene/polyethylene fibers to form a mixture and the mixture is made into a fibrous web by using air-laid web forming technology of nonwoven processing in textile industry; the fibrous web is then processed in a drying oven with a temperature between 125° C., which is higher than the melting point of polyethylene, and 165° C., which is lower than the melting point of polypropylene; after polyethylene is melted, the polyethylene fuses the polypropylene with the feathers or feather strands as a whole to form a composite material; the composite material is then cut into plate-shaped, tube-shaped or block-shaped oil absorbent felt of different sizes and specifications by using a cutting apparatus, or it is rolled and packaged directly.

A method of preparing the feather oil absorbent boom structure according to the present invention is detailed as follows:

a) determine the radius of the cloth bag according to the following formula:

$$R_x = \sqrt{\frac{\pi R^2 r + w - a\%\pi R^2 r}{\pi r}}$$

wherein:

$R_x$ refers to the radius of the cloth bag;

w refers to the weight (g) of a unit length (1 m) of the feather oil absorbent boom;

$\pi$ refers to circumference ratio;

R refers to the radius (m) of the oil absorbent boom;

r refers to water density (g/m$^3$); and a % refers to a required percentage of a volume of the feather oil absorbent boom structure sunk into water with respect to a total volume of the feather oil absorbent boom structure, when the feather oil absorbent material of the outer ring is absorbed with water and is saturated;

b) make the cloth bag by using spunbonded-meltblown-spunbonded polypropylene (PP) nonwoven cloth;

c) fill the feather oil absorbent material into the cloth bag, and then tie the opening of the cloth bag; wherein the weight of the feather oil absorbent material being filled is calculated by the formula described in step a.

The present invention has the following advantages:

1. In the feather oil absorbent boom structure having a compound structure comprising an inner core and an outer ring, the spunbonded-meltdown-spunbonded PP nonwoven cloth bag can allow oil to pass through; when water pressure is lower than 300 mmH$_2$O, water cannot pass through the cloth bag and reach the feather oil absorbent material of the inner core. Therefore, if the density of the inner core can be controlled within the range of 10 kg/m$^3$-40 kg/m$^3$, the inner core can provide sufficient and reliable buoyancy of the feather oil absorbent boom.

2. The present invention can control the sinking depth of the feather oil absorbent boom according to practical needs. A specific depth can be controlled by calculation using the formula described in the method of preparing the feather oil absorbent boom structure. As such, manufacturers can preset the volume of the oil absorbent boom to be sunk into the water after the feathers of the outer ring are absorbed with water and are saturated in order to ensure that a certain volume of the oil absorbent boom can float above the water to effectively prevent spreading of pollutants. This kind of feather oil absorbent boom enables manufacturers to better control the buoyancy of the oil absorbent boom.

3. It is always a complicated situation when water is polluted by oil or organic solvents. For example, the scale of pollution is large while oil or organic solvents is/are unevenly distributed on the water surface. In this case, it is hard to prevent contact of the feather oil absorbent boom with water. In particular, if the scale of pollution is large and thus requiring several days to clean up, it is very hard to prevent water absorption by the feathers of the feather oil absorbent boom. The present invention ensures buoyancy of the feather oil absorbent boom and its effectiveness regarding prevention of spreading pollutants even when the worst situation in which the outer ring is saturated with water is taken into account. During actual practice, the oil absorbent boom will displace water absorbed into the feathers when the oil absorbent boom contacts with oil and organic solvents, it is because the surface tension of oil and organic solvents is weaker than the surface tension of water. Portions of the oil absorbent boom from which water is displaced will not absorb water again when they contact with water again. Therefore, the volume of oil absorbent boom sunk into water should be definitely less than the preset volume when the feather oil absorbent boom is manufactured. In this case, this kind of oil absorbent boom has significantly increased adaptability of treating polluted water and has significantly increased reliability.

4. The feather oil absorbent boom of the present invention uses a compound structure comprising an inner core and an outer ring. This kind of structure has two advantages: Firstly, the inner core being a cloth bag made of PP material is not exposed to direct sunlight during use, thereby significantly slowing down the reduction of strength of the cloth bag due to degradation caused by direct radiation of ultraviolet in sunlight; the plate-shaped oil absorbent felt of the outer ring is much stronger than the material making the cloth bag; although the polyethylene being melted for fusing purpose in the plate-shaped oil absorbent felt will also degrade under direct sunlight, the oil absorbent felt is obviously better in resisting ultraviolet degradation than material made of purely polypropylene since the oil absorbent felt as a whole is made by thermal fusion of feathers and bicomponent fibers of polypropylene/polyethylene having a low melting point. Secondly, when the oil absorbent boom of the present invention experiences wind and waves during use, water can only contact the spunbonded-meltblown-spunbonded PP nonwoven cloth bag after passing through plate-shaped oil absorbent felt of the outer ring; since the plate-shaped oil absorbent felt is a porous material, it will block the water passing through it so that the cloth bag of the inner core bears water pressure on its surface far less than the actual water pressure generated by the water; in this sense, the cloth bag has increased tolerance against hydrostatic pressure. Therefore, the oil absorbent boom of the present invention has an increased adaptability to wind and waves, thereby increasing the reliability of ensuring buoyancy of the oil absorbent boom.

BRIEF DESCRIPTION OF THE DRAWINGS

FIG. 1 is a sectional view showing a structure of the oil absorbent boom of the present invention.

DETAILED DESCRIPTION OF THE INVENTION

The present invention will be further described below with reference to some embodiments. An oil absorbent boom of the present invention comprises two parts, namely an inner core 2 and an outer ring 3 winding outside the inner core 2. The inner core 2 is a cloth bag, and the cloth bag is filled with feather oil absorbent material. The cloth bag is a spunbonded-meltblown-spunbonded polyprophlene (PP) nonwoven cloth. The nonwoven cloth has a surface density of 24 g/m$^2$-50 g/m$^2$ and hydrostatic pressure tolerance of ≥300 mmH$_2$O. The outer ring 3 is a plate-shaped oil absorbent felt formed through thermal fusion of feathers and bicomponent fibers of polypropylene/polyethylene having a low melting point. The weight ratio of the feathers to the polypropylene/polyethylene fibers is 70-85:15-30. The plate-shaped oil absorbent felt has an average surface density of 150 g/m$^2$-400 g/m$^2$.

Preferably, the feather oil absorbent material inside the cloth bag is plate-shaped or tube-shaped or block-shaped oil absorbent felt formed through thermal fusion of feathers and bicomponent fibers of polypropylene/polyethylene having a low melting point. Alternatively, the feather oil absorbent material can be regenerated fibers, cellulosic fibers or feather strands.

Embodiment 1

Production requirements: The feather oil absorbent boom has a diameter of 0.4 m. Weight (w) of the feather oil absorbent boom per meter is set as 1600 g. It is required that when feather oil absorbent material of the outer ring is absorbed with water and is saturated, the oil absorbent boom has 50% of its total volume sunk into the water, in other words, 50% of the oil absorbent boom is still floating above the water.

Firstly, calculate according to the following formula:

$$R_x = \sqrt{\frac{\pi R^2 r + w - a\%\pi R^2 r}{\pi r}}$$

wherein w=1600, R=0.2, a %=50% and r=10$^6$

Result of calculation: spunbonded-meltblown-spunbonded PP nonwoven cloth bag has a radius $R_x$ of 0.143 m. When the cloth bag is sewn and adhered by using ultrasonic in accordance with this radius, the nonwoven cloth bag has a surface density of 50 g/m$^2$.

Total volume (v) of a unit length (1 m) of the oil absorbent boom is $\pi\times(0.2)^2\times1=0.1257$(m$^3$); volume(v$_1$) of the inner core is $\pi\times(0.143)^2\times1=0.0642$(m$^3$); volume (v$_2$) of the outer ring is v−v$_1$=0.0615(m$^3$); weight (w$_1$) of oil absorbent material filled into the inner core is 1600×642÷1257=817 (g/m), and based on this weight, the plate-shaped or tube-shaped or block-shaped oil absorbent felt formed through thermal fusion of feathers and bicomponent fibers of polypropylene/polyethylene having a low melting point or regenerated fibers or ceiba fibers or mixture of the above materials rolled in a tubular shape is filled into the spunbonded-meltblown-spunbonded PP nonwoven cloth bag, and then the bag opening is tied.

Weight (w$^2$) of oil absorbent material of the outer ring is w−w$_1$=783(g/m); cut and obtain the plate-shaped oil absorbent felt formed through thermal fusion of feathers and bicomponent fibers of polypropylene/polyethylene having a low melting point according to the weight (w$_2$), whereas the surface density of the oil absorbent felt is 250 g/m$^2$ and the oil absorbent felt is around 20 mm thick, and then wind and fix the oil absorbent felt outside the inner core. In the oil absorbent felt, weight ratio of feathers to polypropylene/polyethylene fibers is 85:15.

Checking: weight of the oil absorbent material of the outer ring when absorbed with water and saturated is v$_2$×r$_{H_2O}$=61400(g/m), wherein r$_{H_2O}$ is water density (1×10$^6$ g/m$^3$); the oil absorbent boom has its own weight being 1600(g/m); therefore the total weight is 63000(g/m). When the oil absorbent boom is fully sunk into water, the amount of water being displaced is v×r$_{H_2O}$=125700(g/m). Therefore, the actual ratio of the oil absorbent material of the outer ring when absorbed with water and saturated to the oil absorbent boom being sunk into water is 63000÷125700×%=50.1%. This actual ratio is basically the same as the initially desired ratio.

Density of the inner core is 817÷0.0642=12725(g/m$^3$). Density of the outer ring is 783÷0.0615=12731 (g/m$^3$).

Embodiment 2

Production requirements: The feather oil absorbent boom has a diameter of 0.2 m. Weight (w) of the feather oil absorbent boom per meter is set as 1000 g. It is required that when feathers of the outer ring is absorbed with water and is saturated, the oil absorbent boom has 50% of its total volume sunk into the water.

Firstly, calculate according to the following formula:

$$R_x = \sqrt{\frac{\pi R^2 r + w - a\%\pi R^2 r}{\pi r}}$$

wherein w=1000, R=0.1, a % =50% and r=10$^6$

Result of calculation according to the above formula: spunbonded-meltblown-spunbonded PP nonwoven cloth bag has a radius $R_x$ of 0.073 m. When the cloth bag is sewn and adhered by using ultrasonic in accordance with this radius, the nonwoven cloth bag has a surface density of 25 g/m$^2$.

Total volume (v) of a unit length (1 m) of the oil absorbent boom is $\pi\times(0.1)^2\times1=0.0314$(m$^3$); volume(v$_1$) of the inner core is $\pi\times(0.073)^2 1=0.0167$(m$^3$); volume (v$_2$) of the outer ring is v=v$_1$=0.0147(m$^3$); weight (w$_1$) of oil absorbent material filled into the inner core is 1000×167÷314=532(g/m), and based on this weight, the plate-shaped or tube-shaped or block-shaped oil absorbent felt formed through thermal fusion of feathers and bicomponent fibers of polypropylene/polyethylene having a low melting point or regenerated fibers or ceiba fibers or mixture of the above materials rolled in a tubular shape is filled into the spunbonded-meltblown-spunbonded PP nonwoven cloth bag, and then the bag opening is tied.

Weight (w$_2$) of oil absorbent material of the outer ring is w−w$_1$=468(g/m); cut and obtain the plate-shaped oil absorbent felt formed through thermal fusion of feathers and bicomponent fibers of polypropylene/polyethylene having a low melting point according to the weight (w$_2$), whereas the surface density of the oil absorbent felt is 400 g/m$^2$ and the oil absorbent felt is around 15 mm thick, and then wind and fix the oil absorbent felt outside the inner core. In the oil absorbent felt, weight ratio of feathers to polypropylene/polyethylene fibers is 70:30.

Checking: weight of the oil absorbent material of the outer ring when absorbed with water and saturated is v$_2$×r$_{H_2O}$=16700(g/m); the oil absorbent boom has its own weight being 1000(g/m); therefore the total weight is 17700 (g/m). When the oil absorbent boom is fully sunk into water, the amount of water being displaced is v×r$_{H_2O}$=31400(g/m). Therefore, the actual ratio of the oil absorbent material of the outer ring when absorbed with water and saturated to the oil absorbent boom being sunk into water is 16700÷31400=53.2%. This actual ratio is basically the same as the initially desired ratio.

Density of the inner core is 532÷0.0167=31856(g/m³). Density of the outer ring is 468÷0.0147=31836(g/m³).

Embodiment 3

Production requirements: The feather oil absorbent boom has a diameter of 0.4 m. Weight (w) of the feather oil absorbent boom per meter is set as 1800 g. It is required that when feathers of the outer ring is absorbed with water and is saturated, the oil absorbent boom has 40% of its total volume sunk into the water.

Firstly, calculate according to the following formula:

$$R_x = \sqrt{\frac{\pi \mathfrak{R}^2 r + w - a\%\pi\mathfrak{R}^2 r}{\pi r}}$$

wherein w=1800, R=0.2, a %=40% and r=10⁶

Result of calculation according to the above formula: spunbonded-meltblown-spunbonded PP nonwoven cloth bag has a radius $R_x$ of 0.157 m. When the cloth bag is sewn and adhered by using ultrasonic in accordance with this radius, the nonwoven cloth bag has a surface density of 50 g/m².

Total volume (v) of a unit length (1 m) of the oil absorbent boom is π×(0.2)²×1=0.1257(m³); volume($v_1$) of the inner core is π×(0.157)²×1=0.0774(m³); volume ($v_2$) of the outer ring is v–$v_1$=0.0483(m³); weight ($w_1$) of oil absorbent material filled into the inner core is 1800×774÷1257=1108 (g/m), and based on this weight, the plate-shaped or tube-shaped or block-shaped oil absorbent felt formed through thermal fusion of feathers and bicomponent fibers of polypropylene/polyethylene having a low melting point or regenerated fibers or ceiba fibers or mixture of the above materials rolled in a tubular shape is filled into the spunbonded-meltblown-spunbonded PP nonwoven cloth bag, and then the bag opening is tied.

Weight ($w_2$) of oil absorbent material of the outer ring is w–$w_1$=692(g/m); cut and obtain the plate-shaped oil absorbent felt formed through thermal fusion of feathers and bicomponent fibers of polypropylene/polyethylene having a low melting point according to the weight ($w_2$), whereas the surface density of the oil absorbent felt is 200 g/m² and the oil absorbent felt is around 15 mm thick, and then wind and fix the oil absorbent felt outside the inner core. In the oil absorbent felt, weight ratio of feathers to polypropylene/polyethylene fibers is 70:30.

Checking: the actual ratio of the oil absorbent material of the outer ring when absorbed with water and saturated to the oil absorbent boom being sunk into water is 50100÷125700×% =39.9%. This actual ratio is basically the same as the initially desired ratio.

Density of the inner core is 14315(g/m³). Density of the outer ring is 14327(g/m³).

Embodiment 4

Production requirements: The feather oil absorbent boom has a diameter of 0.5 m. Weight (w) of the feather oil absorbent boom per meter is set as 2500 g. It is required that when feathers of the outer ring is absorbed with water and is saturated, the oil absorbent boom has 60% of its total volume sunk into the water.

Firstly, calculate according to the following formula:

$$R_x = \sqrt{\frac{\pi \mathfrak{R}^2 r + w - a\%\pi\mathfrak{R}^2 r}{\pi r}}$$

wherein w=1000, R=0.25, a %=60% and r=10⁶

Result of calculation according to the above formula: spunbonded-meltblown-spunbonded PP nonwoven cloth bag has a radius $R_x$ of 0.161 m. When the cloth bag is sewn and adhered by using ultrasonic in accordance with this radius, the nonwoven cloth bag has a surface density of 50 g/m².

Total volume (v) of a unit length (1 m) of the oil absorbent boom is π×(0.25)²×1=0.19625(m³); volume($v_1$) of the inner core is π×(0.161)²×1=0.0814(m³); volume ($v_2$) of the outer ring is v–$v_1$=0.11485(m³); weight ($w_1$) of oil absorbent material filled into the inner core is 2500× 8140÷19625=1037(g/m), and based on this weight, the plate-shaped or tube-shaped or block-shaped oil absorbent felt formed through thermal fusion of feathers and bicomponent fibers of polypropylene/polyethylene having a low melting point or regenerated fibers or ceiba fibers or mixture of the above materials rolled in a tubular shape is filled into the spunbonded-meltblown-spunbonded PP nonwoven cloth bag, and then the bag opening is tied.

Weight ($w_2$) of oil absorbent material of the outer ring is w–$w_1$=1463(g/m); cut and obtain the plate-shaped oil absorbent felt formed through thermal fusion of feathers and bicomponent fibers of polypropylene/polyethylene having a low melting point according to the weight ($w_2$), whereas the surface density of the oil absorbent felt is 250 g/m² and the oil absorbent felt is around 20 mm thick, and then wind and fix the oil absorbent felt outside the inner core. In the oil absorbent felt, weight ratio of feathers to polypropylene/polyethylene fibers is 70:30.

Checking: The actual ratio of the oil absorbent material of the outer ring when absorbed with water and saturated to the oil absorbent boom being sunk into water is 117350÷196250×% =59.8%. This actual ratio is basically the same as the initially desired ratio.

Density of the inner core is 12739(g/m³). Density of the outer ring is 12738(g/m³).

Embodiment 5

Production requirements: The feather oil absorbent boom has a diameter of 0.2 m. Weight (w) of the feather oil absorbent boom per meter is set as 1200 g. It is required that when feathers of the outer ring is absorbed with water and is saturated, the oil absorbent boom has 30% of its total volume sunk into the water.

Firstly, calculate according to the following formula:

$$R_x = \sqrt{\frac{\pi \mathfrak{R}^2 r + w - a\%\pi\mathfrak{R}^2 r}{\pi r}}$$

wherein w=1200, R=0.1, a % =30% and r=10⁶

Result of calculation according to the above formula: spunbonded-meltblown-spunbonded PP nonwoven cloth bag has a radius $R_x$ of 0.086 m. When the cloth bag is sewn and adhered by using ultrasonic in accordance with this radius, the nonwoven cloth bag has a surface density of 25 g/m².

Total volume (v) of a unit length (1 m) of the oil absorbent boom is π×(0.1)²×1=0.0314(m³); volume($v_1$) of the inner core is $\pi \times (0.086)^2 \times 1 = 0.0232(m^3)$; volume ($v_2$) of the outer ring is $v-v_1=0.0082(m^3)$; weight ($w_1$) of oil absorbent material filled into the inner core is $1200 \times 232 \div 314 = 886(g/m)$, and based on this weight, the plate-shaped or tube-shaped or block-shaped oil absorbent felt formed through thermal fusion of feathers and bicomponent fibers of polypropylene/polyethylene having a low melting point or regenerated fibers or ceiba fibers or mixture of the above materials rolled in a tubular shape is filled into the spunbonded-meltblown-spunbonded PP nonwoven cloth bag, and then the bag opening is tied.

Weight ($w_2$) of oil absorbent material of the outer ring is $w-w_1=314(g/m)$; cut and obtain the plate-shaped oil absorbent felt formed through thermal fusion of feathers and bicomponent fibers of polypropylene/polyethylene having a low melting point according to the weight ($w_2$), whereas the surface density of the oil absorbent felt is 160 g/m² and the oil absorbent felt is around 8 mm thick, and then wind and fix the oil absorbent felt outside the inner core. In the oil absorbent felt, weight ratio of feathers to polypropylene/polyethylene fibers is 70:30.

Checking: The actual ratio of the oil absorbent material of the outer ring when absorbed with water and saturated to the oil absorbent boom being sunk into water is $9400 \div 31400 \times \% = 29.9\%$. This actual ratio is basically the same as the initially desired ratio.

Density of the inner core is $886 \div 0.0232 = 38189(g/m^3)$. Density of the outer ring is $314 \div 0.0082 = 38292(g/m^3)$.

A person skilled in this field of art should understand that the embodiments described above are examples only. The embodiments are described so that the present invention can be better understood. The embodiments are not intended to limit the scope of protection of the present invention. Any changes and modification made in accordance with the spirit of the present invention should also fall within the scope of protection of the present invention.

What is claimed is:

1. A feather oil absorbent boom structure;
   wherein the feather oil absorbent boom comprises:
   an inner core; and
   an outer ring surrounding an outside of the inner core;
   wherein the inner core is a cloth bag;
   an oil absorbent material is filled into the cloth bag;
   wherein the cloth bag is made of a nonwoven cloth which includes a layer of meltblown polypropylene nonwoven fabric located between two layers of spunbonded polypropylene nonwoven fabric;
   the nonwoven cloth has a surface density of 24 g/m²-50 g/m² and hydrostatic pressure tolerance of ≥300 mmH₂O;
   the outer ring is a plate-shaped oil absorbent felt formed through thermal fusion of feathers and bicomponent fibers of polypropylene and polyethylene having a low melting point;
   wherein a weight ratio of the feathers to the bicomponent fibers of polypropylene and polyethylene having a low melting point is 70-85: 15-30;
   wherein the oil absorbent felt has an average surface density of 150 g/m²-400 g/m².

2. The feather oil absorbent boom structure as in claim 1, wherein the oil absorbent material is plate-shaped oil absorbent felt formed through thermal fusion of feathers and bicomponent fibers of polypropylene and polyethylene having a low melting point.

3. The feather oil absorbent boom structure as in claim 1, wherein the oil absorbent material is feather strands.

4. The feather oil absorbent boom structure as in claim 1, wherein a relationship between a radius of the cloth bag and sunk volume of the feather oil absorbent boom structure is expressed according to the following formula:

$$R_x = \sqrt{\frac{\pi R^2 r + w - a\%\pi R^2 r}{\pi r}}$$

wherein:
$R_x$ refers to the radius of the cloth bag;
w refers to weight (g) of a unit length (1 m) of the feather oil absorbent boom;
π refers to circumference ratio;
R refers to a radius (m) of the oil absorbent boom;
r refers to water density (g/m³); and
a % refers to a required percentage of a volume of the feather oil absorbent boom structure sunk into water with respect to a total volume of the feather oil absorbent boom structure, when the oil absorbent felt of the outer ring is absorbed with water and is saturated.

5. The feather oil absorbent boom structure as in claim 4, wherein a density of the inner core is 10 kg/m³-40 kg/m³.

* * * * *